US012670114B2

(12) United States Patent
Kangas et al.

(10) Patent No.: US 12,670,114 B2
(45) Date of Patent: Jun. 30, 2026

(54) CABLE FOR ROUTING SIGNALS IN A SYSTEM LACKING A BACKPLANE

(71) Applicant: Lenovo (Singapore) Pte. Ltd., New Tech Park (SG)

(72) Inventors: P. Daniel Kangas, Raleigh, NC (US); Jean J. Xu, Cary, NC (US); Alan L. Painter, Apex, NC (US); James Michael Dupuy, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 80 days.

(21) Appl. No.: 18/400,192

(22) Filed: Dec. 29, 2023

(65) Prior Publication Data

US 2025/0217308 A1     Jul. 3, 2025

(51) Int. Cl.
| | |
|---|---|
| *G06F 13/00* | (2006.01) |
| *G06F 13/40* | (2006.01) |
| *G06F 13/42* | (2006.01) |

(52) U.S. Cl.
CPC ...... G06F 13/4068 (2013.01); G06F 13/4221 (2013.01); *G06F 2213/0016* (2013.01); *G06F 2213/0026* (2013.01)

(58) Field of Classification Search
CPC ............. G06F 13/4068; G06F 13/4221; G06F 2213/0016; G06F 2213/0026
See application file for complete search history.

(56) References Cited

U.S. PATENT DOCUMENTS

| | | | | |
|---|---|---|---|---|
| 9,166,308 B2 * | 10/2015 | Byrne | ................... | H01R 25/00 |
| 11,726,660 B1 | 8/2023 | Hadav et al. | | |
| 2018/0329844 A1 * | 11/2018 | Worley | ............... | G06F 13/385 |
| 2020/0065273 A1 * | 2/2020 | Bouda | ................ | G06F 13/4282 |
| 2020/0097054 A1 | 3/2020 | Lin et al. | | |
| 2020/0196473 A1 * | 6/2020 | Kai | ........................... | G06F 1/16 |
| 2025/0147677 A1 * | 5/2025 | Ristau | ................... | G06F 3/0673 |
| 2025/0156294 A1 * | 5/2025 | Dupuy | ............... | G06F 11/3034 |

OTHER PUBLICATIONS

"Universal Backplane Management (UBM) White Paper", Microsemi, Aug. 31, 2019, pp. 1-9.

* cited by examiner

*Primary Examiner* — Henry Tsai
*Assistant Examiner* — Kim T Huynh
(74) *Attorney, Agent, or Firm* — Kunzler Needham Hilton

(57)     ABSTRACT

An apparatus, system, and method for signal routing in a system lacking a backplane. One apparatus includes an interface card and a cable having a first connector configured to couple with a storage drive via the interface card, a second connector configured to couple with a motherboard, and a third connector configured to couple with a storage controller located apart from the motherboard. The cable routes control signals and data signals between the storage drive, the storage controller, and the motherboard.

20 Claims, 10 Drawing Sheets

1100

1008

1102 — Loop-back a UBM signal from a remote storage controller to the motherboard 1104 — Receive a first PERST signal from the remote storage controller 1106 — Receive a second PERST signal from the motherboard 1108 — Combine the first and second PERST signals 1110 — Output the combined signal to the storage drive

CABLE FOR ROUTING SIGNALS IN A SYSTEM LACKING A BACKPLANE

FIELD

The subject matter disclosed herein relates to storage drives and more particularly relates to backplane-less storage bays with a passive cable connecting the motherboard, storage drive, and storage controller.

BACKGROUND

A "backplane" card refers to a group of electrical connectors, e.g., formed on a printed circuit board ("PCB"), for linking a computer expansion card, such as a storage drive, to the motherboard of the system unit. A backplane card typically plugs into a slot on the motherboard. Servers commonly have a backplane card to attach storage drives (e.g., hard disk drives and/or solid state drives). A workstation may also have a backplane card to attach hot swappable storage drives. However, the backplane cards do not support a wide variety of storage drives, but may support only a couple different drive types with both connectors installed on the backplane. These 'flexible' drive bays still use a backplane card, and the cost of the backplane goes up as it supports more drive types.

BRIEF SUMMARY

Disclosed are techniques for signal routing via data cable in a system lacking a backplane. Said techniques may be implemented by apparatus, systems, methods, or computer program products.

According to one aspect, an apparatus that supports techniques for signal routing via data cable in a system lacking a backplane includes an interface card and a passive cable that includes a first connector configured to couple with a storage drive via the interface card, a second connector configured to couple with a motherboard, and a third connector configured to couple with a remote storage controller located apart from the motherboard, where the passive cable routes control and data signals between the storage drive, the storage controller, and the motherboard.

According to another aspect, a system that supports techniques for signal routing via data cable in a system lacking a backplane includes a motherboard, a storage controller located apart from the motherboard, a storage bay lacking a backplane card, a storage drive located in the storage bay, and a cable communicatively coupled to the motherboard, the storage controller, and the storage drive. In various embodiments, the cable includes: a first connector configured to couple with the storage drive, a second connector configured to couple with the motherboard, and a third connector configured to couple with the storage controller, where the cable routes control and data signals between the storage drive, the storage controller, and the motherboard.

According to a third aspect, a method for signal routing via data cable in a system lacking a backplane includes coupling at least one storage drive located in the storage bay via a first connector of a cable and coupling a motherboard via a second connector of the cable. The method may include coupling a storage controller located apart from the motherboard via a third connector of the cable and routing control signals and data signals between the storage drive, the storage controller, and the motherboard.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
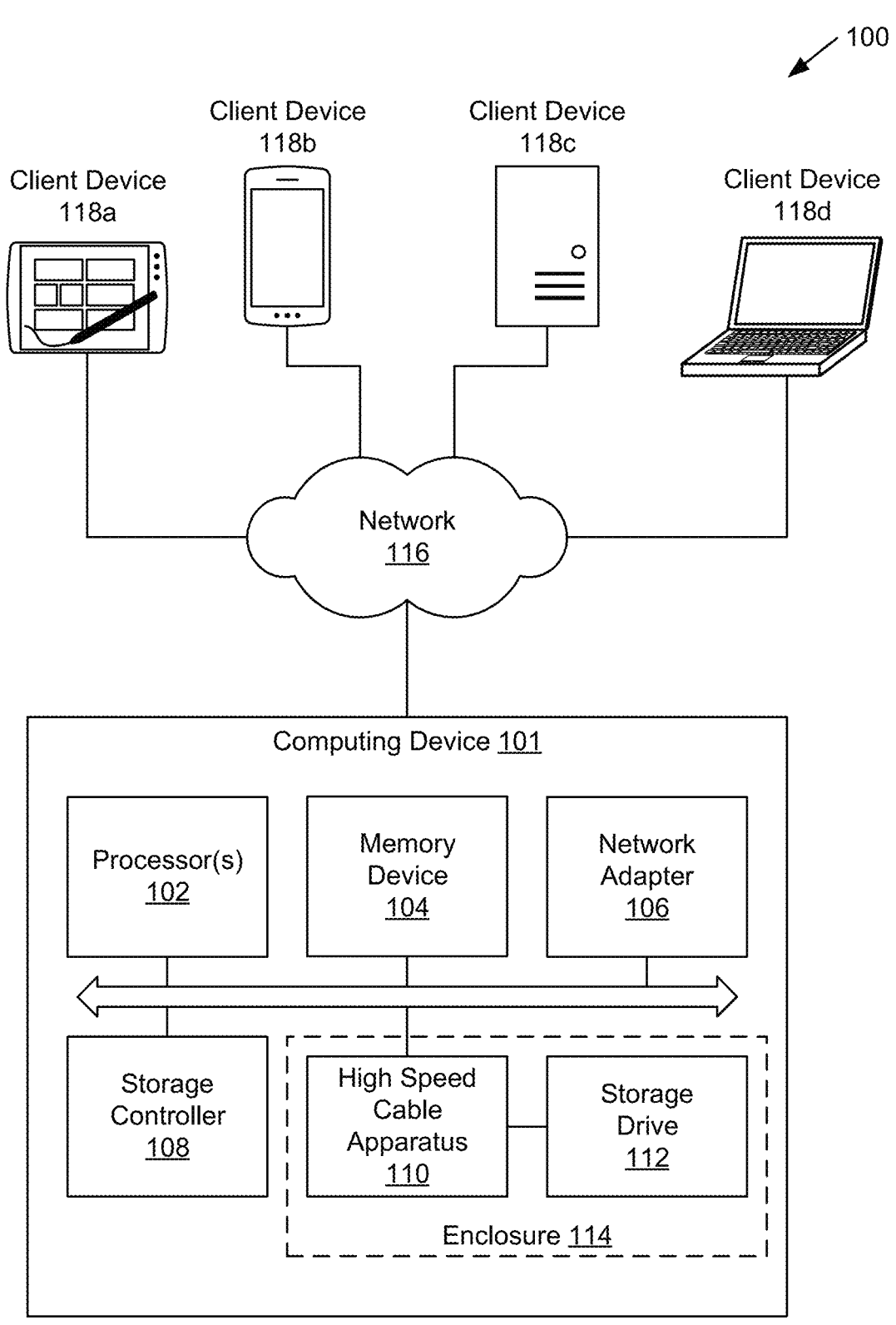
FIG. 1 illustrates one example of a system that supports techniques for signal routing via data cable in a system lacking a backplane in accordance with aspects of the present disclosure.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable logic array ("PLA"), programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM"), an electrically erasable programmable read-only memory ("EEPROM"), a Flash memory, a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")). In some embodiments, electronic circuitry including, for example, programmable logic circuitry, FPGAs, or PLAs may execute the computer readable program instructions by utilizing state information of the computer readable program instructions to personalize the electronic circuitry, in order to perform aspects of the present invention.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to flowchart illustrations and/or block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code or computer readable program instructions.

The code (e.g., computer readable program instructions) may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The code (e.g., computer readable program instructions) may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The code (e.g., computer readable program instructions) may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes apparatuses, systems, and methods that support techniques for signal routing via data cable in a system lacking a backplane. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Several key problems exist with the current backplane card solution on workstation designs with new Front Access, hot-swap bays. First, the backplanes do not support a wide variety of storage drives, but may support only a couple different drive types with both connectors installed on the backplane. These 'flexible' drive bays still use a backplane card, and the cost of the Backplane goes up as it supports more drive types.

Second, the additional backplane PCB material adds electrical loss and reduces the signal trace length. Longer signal trace length is needed for higher speed signals such as Peripheral Component Interconnect Express ("PCIe") Gen5 and Gen6 bus speeds. Third, the backplane is usually a large PCB card which takes up needed space in the storage bay area of the chassis. Fourth, the backplane PCB card represents a large cost adder to the design with additional PCB card material and solder assembly and testing cost for a separate card.

Aspects of the present disclosure disclose techniques to reduce the cost and complexity of hybrid-workstations using Front Access hot-swap storage bays. Specifically, the backplane card may be eliminated and replaced with a solution using the following:

First, the conventional backplane control circuitry is located on the Motherboard (or a PCIe add-in card). Examples of the relocated circuitry include, but are not limited to, the storage slot controller, hot swap circuits, LED circuits, Inter-Integrated Circuit ("I2C") side band/service processor, etc. As an extension to this first solution, the storage controller (e.g., a PCIe Storage controller and/or RAID adapter card) may be located external to the motherboard (but still within the system unit enclosure).

Second, a high-speed cable is used to route signals (e.g., data signals, control signals, sideband signals) to the correct places. More specifically, a passive cabling design (i.e., no electronics, just wires) with 3 connector ends may be used to route data, control, and sideband signals between the motherboard, the storage devices, and the storage controller.

Third, a smaller interposer card (also referred to as an "interface card" or "connector card") with connectors (but no controllers) may be used to adapt multiple drive types to the cable. For example, one end of the interposer card has a first connector for connecting to the high-speed cable (e.g., both physically and electrically) and has one or more second connectors for connecting to a corresponding number of storage drives. In the following descriptions, an interposer card with two non-volatile memory express ("NVME") slots is described; however, in other embodiments more or fewer storage drive connections may be included on the interposer card. It is important to note that the size of the interposer card should be reduced in order to minimize the space/ volume taken by the cable and interposer card within the storage bay.

Fourth, the interposer card may be eliminated by forming the passive cable to utilize the same connector type as a common or an emerging NVME drive type to eliminate the interposer card completely for the most modern NVME solid state drives. For example, at the time of invention, the Enterprise and Datacenter Standard Form Factor ("EDSFF") drive type recently emerged in the market and most new NVME storage uses an EDSFF-define format, such as the E1.S format or the E3.S format. Accordingly, the passive cable may include a slot connector for E1.S or E3.S drives, thereby eliminating the need for the interposer card.

E1.S is a relatively new flash form factor defined under the EDSFF specifications. The E1.S form factors are becoming pervasive for high capacity and hot swappable NVME storage. The form factors included in the EDSFF specification are the E1.S (short), the E1.L (long), the E3.S (short), and the E3.L (long). The EDSFF specifications define the physical dimensions, mechanical connectors, and electrical interfaces that an E1.S device is to have, to ensure compatibility among different hardware providers. The E1.S standard is meant to replace previous generation solid state storage device form factors, such as the M.2 standard. While M.2 devices are popular at the time of writing, it is expected that the server manufacturers and vendors will shift quickly to the new E1.S form factors. However, M.2 devices may have a longer presences in the desktop space due to their lower cost.

An apparatus, a system, and a method that support techniques for signal routing via data cable in a system lacking a backplane are disclosed. According to one aspect of the disclosure, the apparatus may include an interface card and a passive cable that includes A) a first connector configured to couple with a storage drive via the interface card; B) a second connector configured to couple with a motherboard; and C) a third connector configured to couple with a remote storage controller located apart from the motherboard, where the passive cable routes control and data signals between the storage drive, the remote storage controller, and the motherboard.

In some embodiments, the passive cable routes one or more I2C sideband signals between the storage drive and a service processor located on the motherboard. In some embodiments, the first connector is configured to support two or more storage drives.

In some embodiments, the first connector includes an EDSFF socket connector configured to receive an EDSFF edge connector. In certain embodiments, the interface card couples with the EDSFF socket connector, wherein the interface card is further configured to adapt a non-EDSFF edge connector of the storage drive to the EDSFF socket connector. Such adaptation may include passive aspects (i.e., routing pinouts between the non-EDSFF edge connector and the EDSFF socket connector) and/or active aspects (i.e., signal conditioning and/or translation/alteration of signal outputs between EDSFF signal formats and non-EDSFF signal formats).

In some embodiments, the passive cable supports an eight data lane ("×8") PCIe connection between the storage drive and the remote storage controller. In one embodiment, the remote storage controller is a PCIe controller. In another embodiment, the remote storage controller is a RAID adapter card.

In some embodiments, the interface card may be configured to loop-back a Universal Backplane Management ("UBM") signal to the motherboard. In certain embodiments, the passive cable supports a UBM bus between the remote storage controller and the motherboard (e.g., a hot swap controller on the motherboard).

In some embodiments, the interface card may be configured to combine a first PCI Express Reset ("PERST") signal received from the remote storage controller with a second PERST signal received from the motherboard. In such embodiments, the interface card is further configured to output the combined signal to the storage drive.

According to another aspect of the invention, a system may include A) a motherboard, B) a storage controller located separately from the motherboard, C) a storage bay lacking a backplane card, D) a storage drive located in the storage bay, and E) a cable communicatively coupled to the motherboard, the storage controller, and the storage drive. In various embodiments, the cable includes: i) a first connector configured to couple with the storage drive, ii) a second connector configured to couple with the motherboard, and iii) a third connector configured to couple with the storage controller, where the cable routes control and data signals between the storage drive, the storage controller, and the motherboard.

In some embodiments, the motherboard includes at least one service processor (separate from the storage controller), so that the cable routes one or more I2C sideband signals between the storage drive and the at least one service processor. In some embodiments, the motherboard includes power pins, ground pins, and hot-swap circuitry for the storage drive.

In some embodiments, the motherboard includes at least one activity indicator, and where the cable routes one or more activity signals between the storage drive and the motherboard. In some embodiments, the first connector is configured to support two or more storage drives.

In some embodiments, the first connector includes an EDSFF socket connector configured to receive an EDSFF edge connector. In certain embodiments, the system further includes a connector card coupled with the EDSFF socket connector and configured to adapt a non-EDSFF edge connector of the storage drive to the EDSFF socket connector.

In some embodiments, the cable supports an ×8 PCIe connection between the storage drive and the storage controller. In one embodiment, the storage controller is a PCIe controller. In another embodiment, the storage controller is a RAID adapter card.

In some embodiments, the cable further includes a connector card configured to loop-back a UBM signal to the motherboard. In certain embodiments, the cable supports a UBM bus between the storage controller and the motherboard (e.g., a hot swap controller on the motherboard).

In some embodiments, the cable further includes a connector card configured to combine a first PERST signal received from the storage controller with a second PERST signal received from the motherboard, and where the connector card is configured to output the combined signal to the storage drive.

According to a third aspect of the invention, a method may include coupling at least one storage drive located in the storage bay via a first connector of a cable and coupling a motherboard via a second connector of the cable. The method may include coupling a storage controller via a third connector of the cable—where the storage controller is not located on the motherboard—and routing control signals and data signals between the storage drive, the storage controller, and the motherboard.

In some embodiments, the method further includes providing a UBM bus between the storage controller and a storage backplane controller located on the motherboard, and looping-back a UBM signal from the controller to the motherboard.

In some embodiments, the method further includes receiving a first PERST signal from the storage controller and receiving a second PERST signal from the motherboard. In such embodiments, the method also includes combining the first PERST signal with the second PERST signal and outputting the combined signal to the storage drive.

FIG. 1 depicts an exemplary system 100 for signal routing via data cable in a system lacking a backplane, in accordance with aspects of the present disclosure. The system 100 is presented to show one example of an environment where an apparatus and method may be implemented in accordance with the embodiments of the disclosure. As depicted, the system 100 may include a computing device 101 comprising at least one processor 102, at least one memory device 104, at least one network adapter 106, at least one storage controller 108, at least one high speed cable apparatus 110, and at least one storage drive 112. In certain embodiments, the high speed cable apparatus and the expansion card are at least partially located in an enclosure 114, such as a storage bay of the computing device 101. In some embodiments, the computing device 101 may be an enterprise server and/or a server in a data center. In other embodiments, the computing device 101 may be a workstation (i.e., capable of performing more computing intensive tasks than a personal computer or similar consumer-grade computing device).

The processor(s) 102 may be operably connected to the memory device(s) 104. The memory device(s) 104 may include one or more non-volatile storage devices such as hard drives, solid state drives, CD-ROM drives, DVD-ROM drives, tape drives, or the like. The memory device(s) 104 may also include non-volatile memory such as a read-only memory (e.g., ROM, EPROM, EEPROM, and/or Flash ROM) or volatile memory such as a random access memory (e.g., RAM or operational memory). A computer bus, or plurality of buses, may interconnect the processor(s) 102, memory device(s) 104, the network adapter(s) 106, the storage controller(s) 108, the high-speed cable apparatus(es) 110, the storage drive(s) 112, and other devices to enable data and/or instructions to pass therebetween. In certain embodiments, the computer bus is at least partially located on (and supported by) a motherboard (not depicted in FIG. 1).

To enable communication with external systems or devices, the computing device 101 may include one or more input/output ("I/O") controllers (not depicted in FIG. 1). Such I/O controller(s) may be embodied as wired ports (e.g., universal serial bus ("USB") ports, serial ports, Firewire ports, Small Computer System Interface ("SCSI") ports, parallel ports, etc.) or wireless ports (e.g., Bluetooth, IrDA, etc.). The I/O controller(s) may enable communication with one or more input devices (e.g., keyboards, mice, touchscreens, cameras, microphones, scanners, storage devices, etc.) and output devices (e.g., displays, monitors, speakers, printers, storage devices, etc.). The I/O controller(s) may also enable communication with other computing devices 101.

In certain embodiments, the computing device 101 includes a wired or wireless network adapter 106 to connect the computing device 101 to a computer network 116, such as a LAN, WAN, or the Internet. Such a computer network 116 may enable the computing device 101 to connect to one or more servers, workstation, mobile computing devices, or other devices. Via the computer network 116, the computing device 101 may be interact with one or more communication client devices, such as a table computer 118a, a mobile phone 118b, a workstation or personal computer 118c, and/or laptop 118d (referred to collectively as "client devices" 118). While not depicted in FIG. 1, the system 100 may include—or be coupled to—various telecommunications equipment, such as email servers, communications servers, routers, switches, gateways, and other network elements and networking devices.

The system 100 is representative of various systems where the embodiments described herein may be deployed. The computing device 101, in some embodiments, is in a data center. In certain embodiments, the computing device 101 is located in a research center, design center, or other workspace. In other embodiments, the computing device 101 is user owned. While a single high speed cable apparatus 110 (and storage drive 112) is depicted, one of skill in the art will recognize that multiple high speed cable apparatuses 110 (i.e., each coupled to at least one more respective storage drive 112) may be deployed on the computing devices 101.

In some embodiments, the computing device 101 may be a rack-mounted server, a workstation, a mainframe computer, a desktop server, a laptop server, and the like or any combination thereof. In such embodiments, the computing device 101 includes one or more processors, memory, data buses, access to non-volatile data storage, I/O connections, and the like. One of skill in the art will recognize other implementations of a computing device 101 comprising at least one high speed cable apparatus 110 coupled to at least one storage drive 112.

The peer devices 118 are depicted as a tablet computer, a smartphone, a desktop computer, and a laptop computer as examples but may be implemented by a workstation, a terminal, or other computing device capable of connection to the computing device 101 over the computer network 116. In some embodiments, a peer device 118 is used by a system administrator for installation, maintenance, control, etc., of the high speed cable apparatus 110 coupled to at least one storage drive 112. For example, a user may use a smartphone as a peer device 118 to interact with the computing device 101 comprising the high speed cable apparatus 110 coupled to at least one storage drive 112.

The computer network 116 connects the peer devices 118 to the computing device 101 to access the storage drive(s) 112 coupled to the high speed cable apparatus 110. The computer network 116 includes one or more networks. For example, the computer network 116 may include a LAN and may include a gateway to the Internet. The computer network 116 network may include cabling, optical fiber, etc. and may also include a wireless connection and may include a combination of network types. The computer network 116 may include a LAN, a WAN, a storage area network ("SAN"), an optical fiber network, etc. Various computer networks that are part of the depicted computer network 116 may be private and/or public, for example, through an Internet Service Provider.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA®"). Alternatively, the wireless connection may be a cellular telephone network communication. All standards and/or connection types include the latest version and revision of the standard and/or connection type as of the filing date of this application.

In various embodiments, the storage drive 112 comprises a solid state storage device. The high speed cable apparatus 110 provides physical connectors and electrical interfaces to allow the storage drive 112 (e.g., located in the storage bay or similar enclosure 114) to connect to the motherboard of the computing device 101 without using a backplane card or similar PCB. Note that the term "high speed" is used to indicate that the high speed cable apparatus supports at least the bus speeds PCIe Gen5 and Gen6. In some embodiments, the high speed cable apparatus 110 provides an ×8 PCIe bus between the storage controller 108, the storage drive 112, and the motherboard of the computing device 101.

In some embodiments, the storage drive 112 may conform to the EDSFF specifications, for example, complying with the E1.S or E3.S formats. In other embodiments, the storage drive 112 does not conform to the EDSFF specifications and the high speed cable apparatus 110 may include an EDSFF connector and an interposer card to adapt the storage drive 112 to the EDSFF connector. In certain embodiments, the interposer card may provide signal adaptation (also referred to as signal blending) to allow the non-EDSFF storage drive 112 (e.g., a M.2 module) to emulate an E1.S or E3.S drive.

While the storage drive 112 and high speed cable apparatus 110 are described primarily with reference to the EDSFF specifications, one of skill in the art will recognize other expansion card (e.g., storage drive) specifications that can be adapted and emulated using the high speed cable apparatus 110 coupled to a storage drive 112.

In various embodiments, the high speed cable apparatus 110 may include an interface card and a passive cable for coupling the storage drive 112 to the computing device 101. Here, the interface card may connect the storage drive 112 to the passive cable, while the passive cable includes additional connectors supporting connections to the motherboard and the storage controller 108. In various embodiments, the cable may be a three-way cable, wherein the storage controller 108 is a remote controller located away from the motherboard. The high speed cable apparatus 110 is described in more detail below in relation to FIGS. 2 through 9.

The high speed cable apparatus 110 replaces a backplane in the computing device 101. One benefit of using a high speed cable is a signal integrity improvement as compared to traces on a PCB. Various studies have shown that a PCB is five times more lossy than twinaxial cabling (i.e., cabling with a twisted pair of inner conductors). Accordingly, the high speed cable apparatus may use twinaxial cabling, triaxial cabling, optical-fiber cabling, or similar high-bandwidth/low-loss cabling.

Beneficially, the signal integrity improvements allow for the elimination of circuitry for supporting long physical channels of the storage system, including retimers and redrivers (e.g., located on the backplane). As used herein, a redriver is a circuit that boosts high-frequency portions of a signal, i.e., to counter a frequency-dependent attenuation. As used herein, a retimer is a circuit that is able to recover data, extract the embedded clock from the signal, and retransmit a fresh copy of the data using a clean clock. Both retimers and redrivers are expensive components and increase the heat generation of the host system (i.e., computing device 101); by eliminating these components (i.e., because the high speed cable replaces the backplane card), system cost is reduced, thermal performance is improved, and power consumption is reduced.

Figure 2:
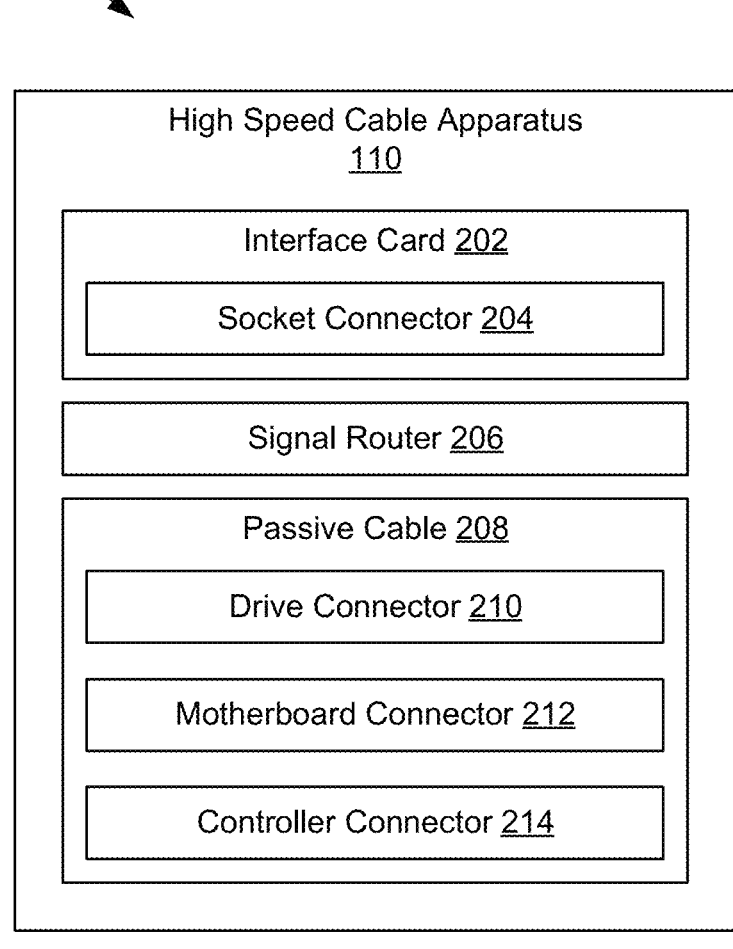
FIG. 2 illustrates one example of a high speed cable apparatus that supports techniques for signal routing via data cable in a system lacking a backplane in accordance with aspects of the present disclosure.

FIG. 2 depicts an exemplary apparatus 200 for signal routing via data cable in a system lacking a backplane, in accordance with aspects of the present disclosure. The apparatus 200 includes one embodiment of the high speed cable apparatus 110 that includes an interface card 202 comprising a socket connector 204, as well as a signal router 206 and a passive cable 208 comprising a drive connector 210, a motherboard connector 212, and a controller connector 214, which are described below.

The apparatus 200 includes an interface card 202 configured to couple a storage drive to the passive cable. The small size of the interface card 202 relative to a conventional backplane card increases the available space within the system chassis, improves airflow (e.g., for improved cooling), and allows for use of a greater variety of devices (i.e., devices conforming to different NVME formats and specification) at a lower price point, relative to the conventional backplane card.

In some embodiments, for connecting to the passive cable 208, the interface card 202 comprises an E1.S edge connector complying with EDSFF specifications for E1.S electrical and mechanical interfaces, e.g., complying with SFF-TA-1006. In one embodiment, the edge connector has a 2C connector size as defined in EDSFF specification. Here, the edge connector may include a notch separating a first set of pin fingers from the remainder of the pin fingers. In another embodiment, the edge connector has a 1C connector size as defined in EDSFF specifications.

The edge connector of the interface card 202 includes multiple pin fingers (also referred to as signal pins) comprising a set of ground pins. To support hot swapping, the set of ground pins may have an extended finger length compared to the remainder of the pin fingers. In certain embodiments, the pin fingers may comprise gold fingers, e.g., conductive pins made of or plated with gold.

The interface card 202 includes a socket connector 204 (e.g., a slot connector) configured to couple with the storage drive. The socket connector 204 may include various pins providing an electrical interface with the computer storage drive 112. In various embodiments, the socket connector 204 is a non-EDSFF connector, such as a M.2 socket complying with PCI-SIG specification for M.2 mechanical and electrical interfaces.

Where the storage drive has a non-EDSFF format, the interface card 202 may further be configured to convert a first set of signals associated with the non-EDSFF format connector type into a second set of signals associated with the EDSFF connector type. For example, the interface card 202 may adapt E1.S signals into signals recognizable by an M.2 device and further adapt M.2 signals into signals recognized by an E1.S host. In further embodiments, the interface card 202 may be configured to pass through various signals common to the EDSFF and non-EDSFF connectors. For example, common signaling between a M.2 device and an E1.S host may include PCIe transmit and receive signals, clock signals, sideband signaling, and the like.

In some embodiments, the interface card 202 may be configured to combine a first PERST signal received from a storage controller (e.g., the storage controller 108) with a second PERST signal received from a motherboard (i.e., of the host system). In such embodiments, the interface card 202 is further configured to output the combined signal to the storage drive.

The apparatus 200 includes a signal router 206 configured to route control signals, data signals and/or sideband signals between the storage drive, the storage controller, and the motherboard. For example, the signal router 206 may be configured to route one or more I2C sideband signals between the storage drive and the at least one service processor located on the motherboard.

Note that the signal router 206 may be implemented entirely (or at least partially) by the arrangement (i.e., wiring and connections) of the passive cable 208. Accordingly, in some embodiments, the apparatus 200 is a passive device that does not contain electronics for signal processing, signal conditioning, etc. In other embodiments, the signal router 206 may be implemented at least partially by in the interface card 202. Here, the interface card 202 may include one or more circuits configured to provide the functionality of the signal router 206.

The apparatus 200 includes a passive cable 208 configured to pass signals (e.g., data signals, control signals, sideband signals, etc.) between the storage drive, the storage controller, and the motherboard.

The passive cable 208 includes at least one drive connector 210 configured to couple with a storage drive (e.g., via the interface card). As indicated above, the drive connector 210 may include an EDSFF socket connector configured to receive an EDSFF edge connector (e.g., of the interface card 202 or the storage drive).

The passive cable 208 includes a motherboard connector 212 configured to couple the motherboard with the storage drive (e.g., via the interface card). The passive cable 208 includes a third connector configured to couple the storage controller with the storage drive (e.g., via the interface card). In some embodiments, the passive cable 208 supports an eight data lane ("×8") Peripheral Component Interconnect Express ("PCIe") connection between the drive connector 210 and the controller connector 214. Where the drive connector 210 is configured to couple to a pair of storage drives 112, the drive connector 210 may support a pair of four data lane ("×4") PCIe between the passive cable 208 and the storage drives.

In some embodiments, the passive cable 208 supports a UBM bus between the motherboard connector 212 and the controller connector 214. For example, the storage controller (at the controller connector 214) may be the UBM host and a hot swap controller on the motherboard (at motherboard connector 212) may be the UBM bus device. In certain embodiments, the signal router 206 may be configured to loop-back a UBM signal from the controller connector 214 to the motherboard connector 212, where the UBM routes from the controller connector 214 (UBM host) to the drive connector 210 (loopback) to the motherboard connector 212 (UBM device). Here, the drive connector 210 may be a connector in a middle portion of the passive cable 208, where the motherboard connector 212 and the controller connector 214 are located on opposite ends of the passive cable 208.

Note that the blocks 202-214 represent functional blocks of the apparatus 200 and may include any component or set of components that perform the functionality attributed to the component. This may include one or more physical processors which execute processor-readable instructions, the processor-readable instructions (e.g., as software application or other executable), circuitry, computer hardware, storage media, some combination of software, hardware, and/or firmware, interfaces, adapters, or any other components.

The description of the functionality provided by the different components 202, 204, 206, 208, 210, 212 and/or 214 described below is for illustrative purposes, and is not intended to be limiting, as any of components 202, 204, 206, 208 and/or 210 may provide more or less functionality than is described. For example, one or more of components 202, 204, 206, 208, 210, 212 and/or 214 may be eliminated, and some or all of its functionality may be provided by other ones of components 202, 204, 206, 208, 210, 212 and/or 214. As another example, the apparatus 200 may comprise additional components that may perform some or all of the functionality attributed above to one or more of the components 202, 204, 206, 208, 210, 212 and/or 214.

Figure 3:
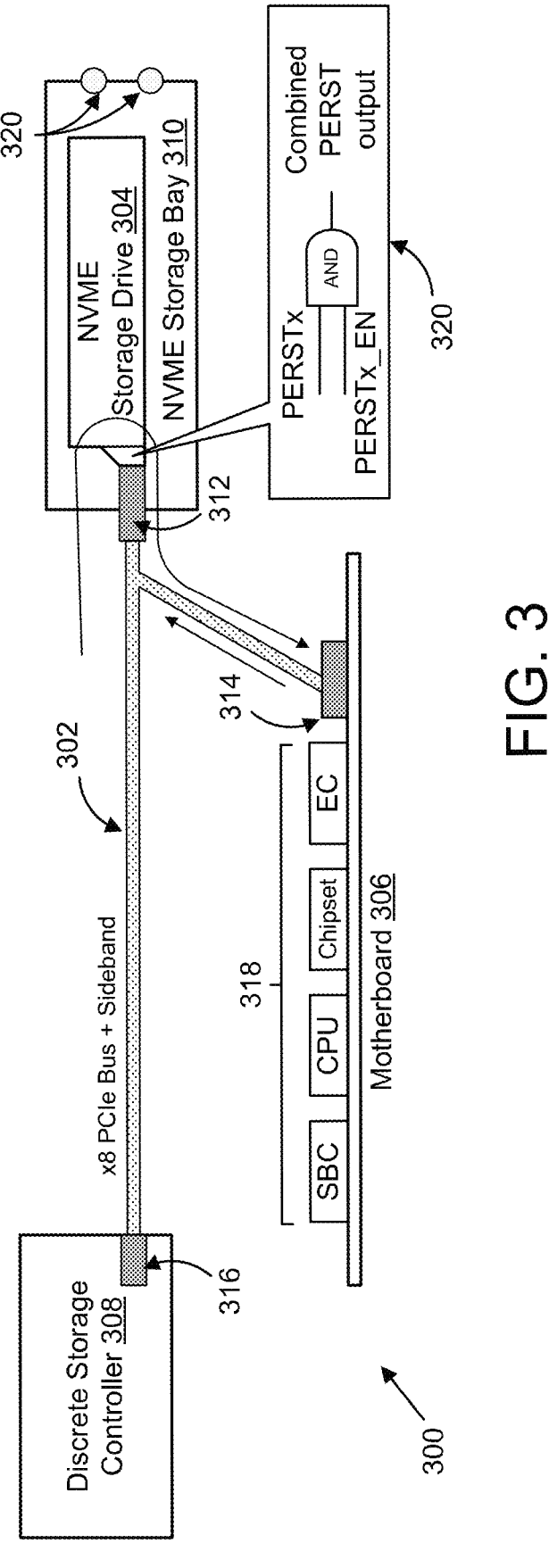
FIG. 3 illustrates one example of an arrangement of a backplane-less system that supports techniques for signal routing via data cable in a system lacking a backplane in accordance with aspects of the present disclosure.

FIG. 3 depicts an embodiment of an exemplary arrangement of a backplane-less system 300, in accordance with aspects of the present disclosure. The backplane-less system 300 includes a high-speed cable 302 coupled to a NVME storage drive 304, a motherboard 306, and a discrete storage controller 308. The high-speed cable 302 provides a three-way connection between the NVME storage drive 304, the motherboard 306, and the discrete storage controller 308.

The high-speed cable 302 includes a first connector 312 that couples to the NVME storage drive 304. The high-speed cable 302 may be an embodiment of the high speed cable apparatus 110 and/or the passive cable 208. The first connector 312 may be one embodiment of the drive connector 210. In certain embodiments, the first connector 312 is a high-speed connector supporting PCIe Gen5 or Gen6. One example of a suitable high-speed connector is the Mini Cool edge IO ("MCIO") connector produced by Amphenol Corporation.

In the depicted embodiment, the NVME storage drive 304 is housed inside an NVME storage bay 310. The NVME storage drive 304 may be one embodiment of the storage drive 112 and the NVME storage bay 310 may be one embodiment of the enclosure 114. In certain embodiments, the NVME storage bay 310 is a front-access storage bay, wherein the NVME storage drive 304 is inserted into the NVME storage bay 310 from a front side of a chassis of the backplane-less system 300, wherein the first connector 312 is located at an opposite side (e.g., back side) of the NVME storage bay 310, such that inserting the NVME storage drive 304 into the NVME storage bay 310 couples the NVME storage drive 304 to the first connector 312.

The high-speed cable 302 includes a second connector 314 that couples to the motherboard 306. The second connector 314 may be one embodiment of the motherboard connector 212. In certain embodiments, the second connector 314 is also a high-speed connector supporting PCIe Gen5 or Gen6. One example of a suitable high-speed connector is the MCIO connector produced by Amphenol Corporation.

The high-speed cable 302 includes a third connector 316 that couples to the discrete storage controller 308. The discrete storage controller 308 may be one embodiment of the storage controller 108. The third connector 316 may be one embodiment of the controller connector 216.

In certain embodiments, the third connector 316 is a high speed connector that supports an ×8 PCIe bus between the NVME storage drive 304 and the discrete storage controller 308, as well as additional paths for communicating sideband signaling. Note that the discrete storage controller 308 may be a hardware RAID (Redundant Array of Independent Disks) controller, such as a PCIe add-in card. Accordingly, the storage controller functionality changes from a motherboard-based embedded controller to a scalable, independent adapter card.

The motherboard 306 comprises a plurality of connectors and electrical components 318, some of which may interact with the NVME storage drive 304 via the high-speed cable 302. For example, the motherboard 306 may include a storage backplane controller ("SBC") chip (e.g., a UBM device), a central processing unit ("CPU"), a chipset, for example a Platform Controller Hub ("PCH"), and an embedded controller ("EC").

In various embodiments, the high speed cable connects the NVME storage drive 304 to power (e.g., 12V) and/or ground pins on the motherboard 306 and also routes several baseboard management controller ("BMC") and/or service processor sideband signals from the motherboard 306 towards the NVME storage drive 304. For example, the EC at the motherboard 306 may communicate I2C sideband signals to the NVME storage drive 304 via the high-speed cable 302.

In some embodiments, to support sideband signaling, the high-speed cable 302 provides a 2-wire Universal Backplane Management ("UBM") bus routed from the discrete storage controller 308 (i.e., the UBM host) to the motherboard 306 (i.e., to a UBM device, such as the SBC). In certain embodiments, the UBM bus is routed onto a connector card coupled to the NVME storage drive 304 (e.g., part of or coupled to the first connector 312) and looped back to the motherboard 306 (e.g., to the SBC).

The NVME storage drive 304 may include one or more integrated LED 320 for indicating storage drive status and/or activity. LED management for indicating status and/or activity of the NVME storage drive 304 is routed via the UBM bus. Conventionally, such signaling and LED management would be handled by the backplane card. However, in the backplane-less system 300 the LED management and related signaling is looped back through the second connector 314 to the motherboard 306. In certain embodiments, the connector card is configured to loop-back the UBM signal to the motherboard 306, e.g., to the SBC chip on the motherboard. In other embodiments, the connector card may be absent from the system 300 (i.e., where the first connector is configured to mount directly to the NVME storage drive 304.

In some embodiments, the sideband signaling between the discrete storage controller 308 and the NVME storage drive 304 includes a first reset signal, such as a PERSTx signal. Additionally, the sideband signaling between the motherboard 306 and the NVME storage drive 304 includes a second reset signal, such as a PERSTx_Enable signal (e.g., from a hot swap controller on the motherboard 306). In certain embodiments, a connector card (e.g., part of or coupled to the first connector 312) is configured to combine the reset signals (i.e., combine the PERSTx and PERSTx-_Enable signals) and to output the combined signal to the NVME storage drive 304. For example, the reset signals may be combined using an AND gate (or similar logic component).

Figure 4:
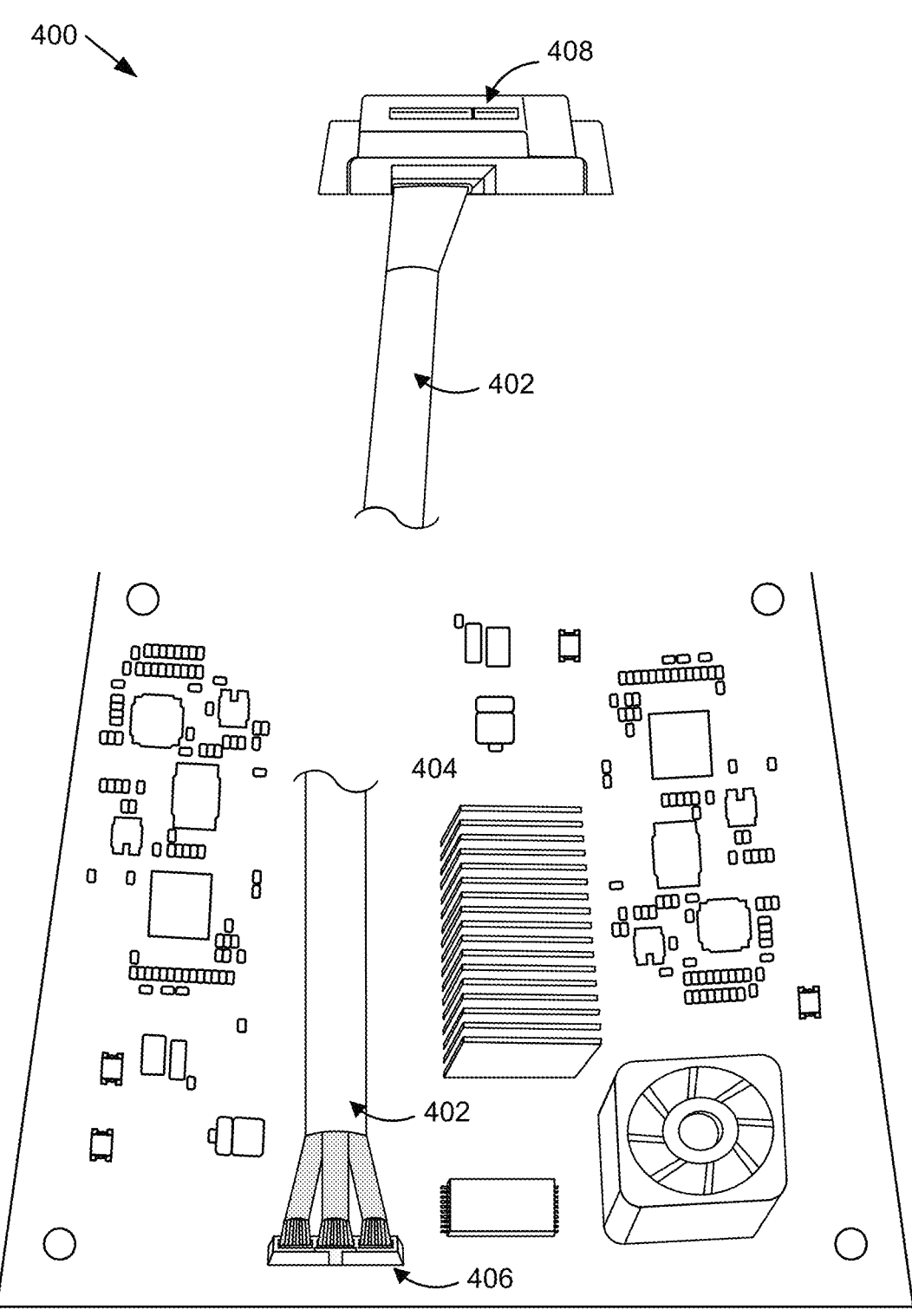
FIG. 4 illustrates one example of an apparatus techniques that supports techniques for signal routing via data cable in a system lacking a backplane in accordance with aspects of the present disclosure.

FIG. 4 illustrates an exemplary apparatus 400 for signal routing via data cable in a system lacking a backplane, in accordance with aspects of the present disclosure. The apparatus 400 includes a high speed cable 402, a motherboard 404, a motherboard connector 406, and an adapter card 408, which are described below.

The apparatus 400 includes a high speed cable 402 configured to route signaling (i.e., data signals, control signals, and/or sideband signals) between the motherboard 404, and a storage drive (not depicted in FIG. 4), and a storage controller (not depicted in FIG. 4). The high speed cable 402 may be an embodiment of the high speed cable apparatus 110, the passive cable 208, and/or the high-speed cable 302.

The apparatus 400 includes a motherboard 404 configured to perform certain sideband signaling with the storage drive. The motherboard 404 may be an embodiment of the motherboard 306. In certain embodiments, the motherboard 404 includes a hot swap controller (i.e., relocated from the now-absent backplane) with power and ground pins. Accordingly, the high-speed cable 302 may support hot swapping functionality of the storage drive. In certain embodiments, the motherboard 404 supports multiple discrete storage controller.

The apparatus 400 includes a motherboard connector 406 configured to couple the high speed cable 402 to the motherboard 404. The motherboard connector 406 may be an embodiment of the motherboard connector 212 and/or the second connector 314. In one embodiment, the motherboard connector 406 may be a MCIO connector.

While a single motherboard connector 406 is depicted, in other embodiments the motherboard 404 may comprise multiple connectors 406. For example, the motherboard 404 may include two or more MCIO, each supporting an ×8 bus.

The apparatus 400 includes an adapter card 408 configured to couple the high speed cable 402 to one or more storage drives. The adapter card 408 may be one embodiment of the interface card 202. The adapter card 408 comprises a connector to transition between the storage drive and the high speed cable 402. Here, the adapter card 408 is configured to interface with a particular form factor of the storage drive(s).

As described above, the adapter card 408 does not contain integrated circuits ("ICs") or logic circuits for backplane functionality. However, the adapter card 408 may include circuitry to loop back—to the motherboard 404—sideband signaling originating from the storage controller. In one embodiment, the adapter card 408 is configured to couple to a single storage drive. In another embodiment, the adapter card 408 is configured to couple to a pair of storage drives.

Figure 5:
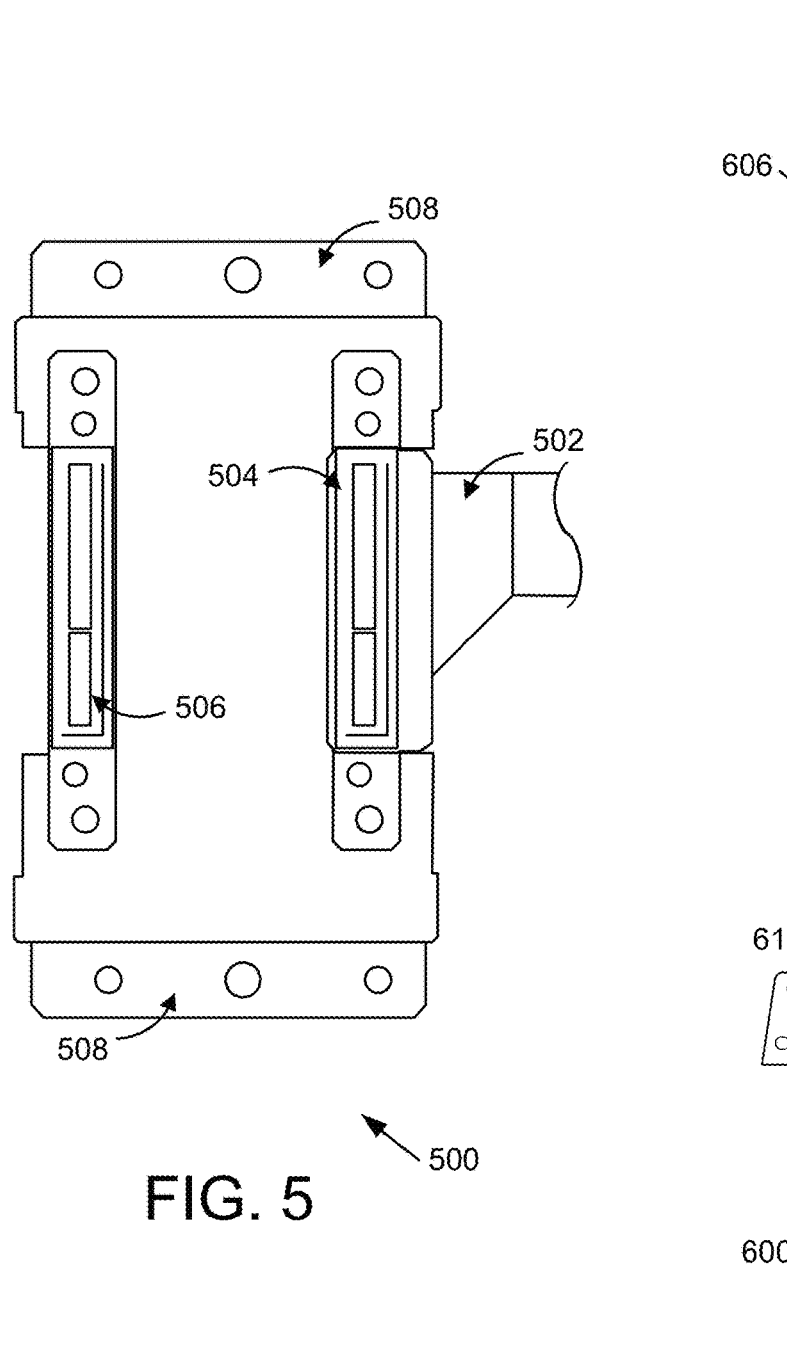
FIG. 5 illustrates one example of an adapter card that supports techniques for signal routing via data cable in a system lacking a backplane in accordance with aspects of the present disclosure.

FIG. 5 depicts an example of an adapter card 500, in accordance with aspects of the present disclosure. The adapter card 500 may be one embodiment of the interface card 202 and/or the adapter card 408. In various embodiments, the adapter card 500 has physical dimensions that enable it to fit inside a front-access storage bay (e.g., an embodiment of the enclosure 114).

In one embodiment, the adapter card 500 may be formed at one end of a high speed cable 502. Here, the high speed cable 502 may be an embodiment of the high speed cable apparatus 110, the passive cable 208, the high-speed cable 302, and/or the high speed cable 402.

The adapter card 500 may include a first socket connector 504 configured to connect/couple to a first storage drive. In some embodiments, the first socket connector 504 is an EDSFF connector (e.g., slot connector) configured to receive an E1.S module. In other embodiments, the first socket connector 504 is a non-EDSFF connector, e.g., configured to receive an M.2 module.

The adapter card 500 may include a second socket connector 506 configured to connect/couple to a second storage drive. In various embodiments, the first and second storage drives are the same type of storage drive (i.e., sharing the same form factor, connector type, and other drive characteristics). In some embodiments, the second socket connector 506 is an EDSFF connector (e.g., slot connector) configured to receive an E1.S module. In other embodiments, the second socket connector 506 is a non-EDSFF connector, e.g., configured to receive an M.2 module.

The adapter card 500 may further include one or more mounting elements 508 for attaching the adapter card 500 to, e.g., a storage bay or system chassis. Moreover, the adapter card 500 may be located within the storage bay (or system chassis) in such a way to allow blind mating of the first and second storage drives.

Figure 6:
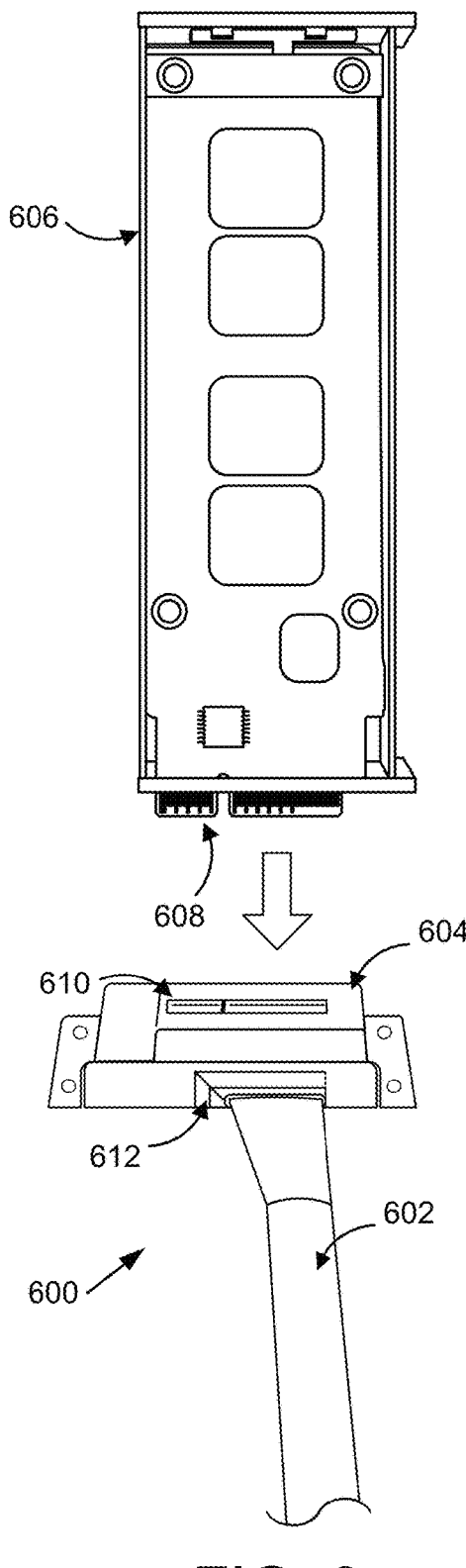
FIG. 6 illustrates one example of an arrangement that supports techniques for signal routing via data cable in a system lacking a backplane in accordance with aspects of the present disclosure.

FIG. 6 depicts an exemplary arrangement 600 of a data cable 602, a connector card 604, and a storage drive 606, in accordance with aspects of the present disclosure. In the arrangement 600, it is assumed that the storage drive 606 includes an edge connector 608 configured to couple with a slot connector 610 of the connector card 604.

The data cable 602 may be one embodiment of the high speed cable apparatus 110, the passive cable 208, the high-speed cable 302, the high speed cable 402, and/or the high speed cable 502. The connector card 604 may be one embodiment of the interface card 202, the adapter card 408, and/or the adapter card 500. In one embodiment, the connector card 604 may be formed on the end of the data cable 602. In another embodiment, the connector card 604 may be attached to the data cable 602, i.e., in a separable manner, at a first connector 612. The first connector 612 may be one embodiment of the drive connector 210 and/or the first connector 312.

The storage drive 606 may be one embodiment of the storage drive 112 and/or the NVME storage drive 304. In one embodiment, the storage drive 606 is an E1.S module complying with EDSFF specifications for E1.S electrical and mechanical interfaces. For example, the edge connector 608 may be an E1.S notched connector having a 2C size, wherein the slot connector 610 comprises an E1.S keyed socket conforming to 2C size. While FIG. 6 depicts the edge connector 608 having a 2C size, in other embodiments the edge connector 608 may be a 1C sized edge connector. In still other embodiments, the storage drive 606 may be a non-EDSFF device, such that the edge connector 608 and slot connector 610 conform to non-EDSFF specifications for electrical and mechanical interfaces.

Figure 7:
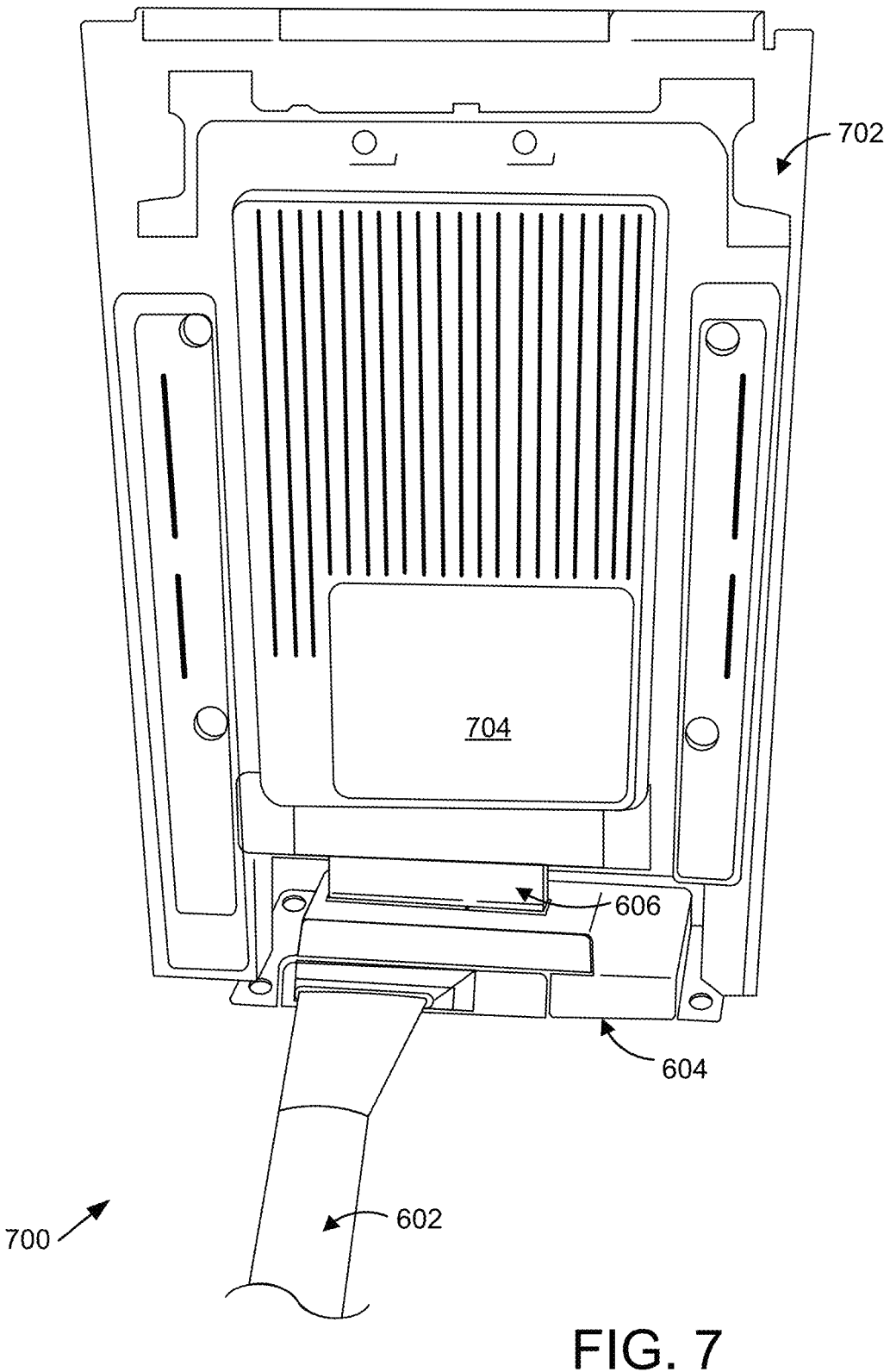
FIG. 7 illustrates one example of an arrangement that supports techniques for signal routing via data cable in a system lacking a backplane in accordance with aspects of the present disclosure.

FIG. 7 depicts an exemplary arrangement 700 of the data cable 602, the connector card 604, and the storage drive 606 mated to the connector card 604, in accordance with aspects of the present disclosure. In the arrangement 700, the storage drive 606 is mounted onto a mounting tray 702 and may be covered with a heatsink 704. While not depicted in FIG. 7, the mounting tray 702 may be inserted within a storage bay thereby mating the storage drive 606 with the connector card 604.

Figure 8:
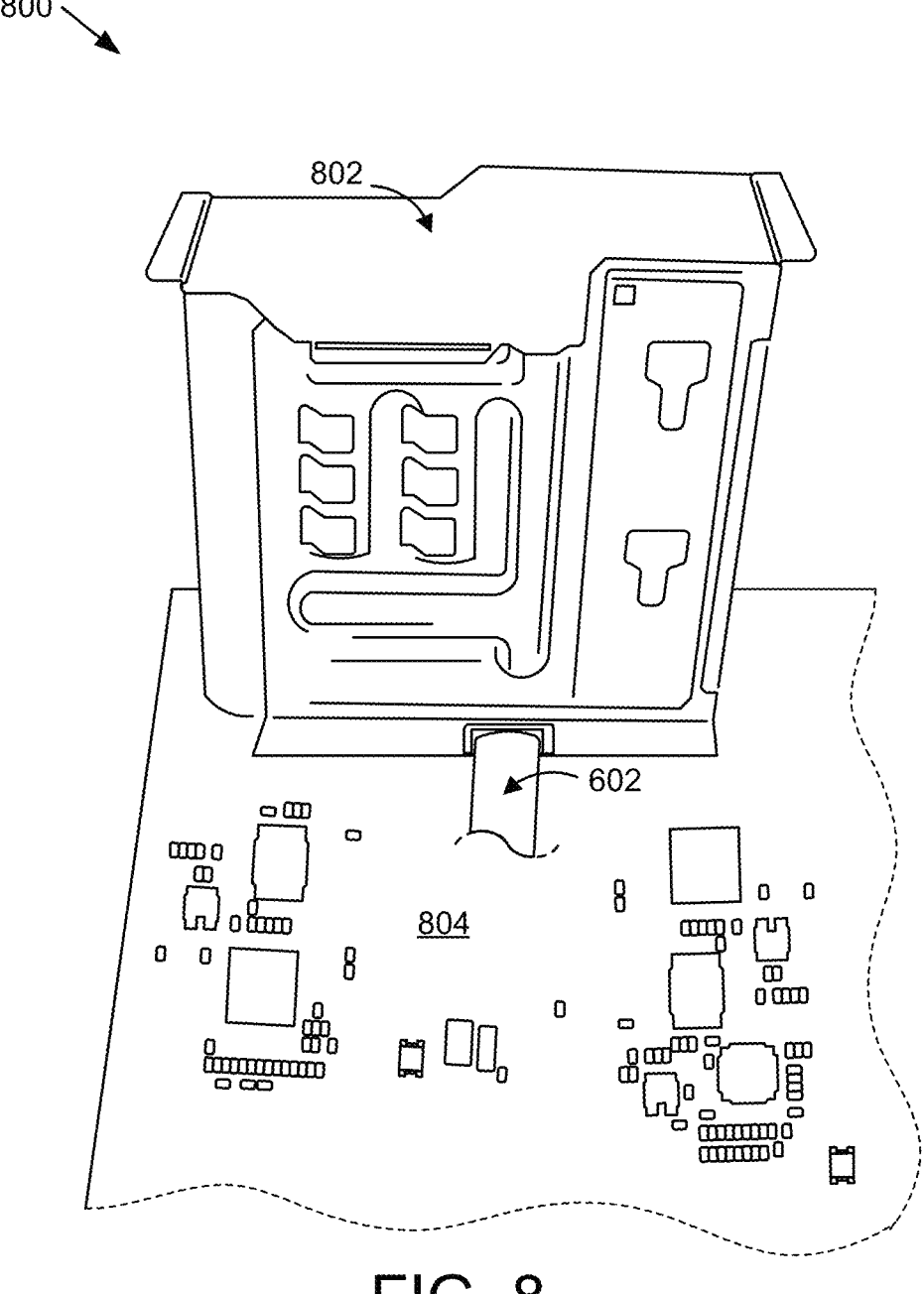
FIG. 8 illustrates one example of an apparatus that supports techniques for signal routing via data cable in a system lacking a backplane in accordance with aspects of the present disclosure.

FIG. 8 depicts an exemplary apparatus 800 for signal routing via data cable in a system lacking a backplane, in accordance with aspects of the present disclosure. The apparatus 800 includes a storage bay 802 located near or attached to a motherboard 804. The storage bay 802 may be one embodiment of the enclosure 114 and/or the NVME storage bay 310. In one embodiment, the storage bay 802 is a front-access storage bay. The motherboard 804 may be one embodiment of the motherboard 306 and/or the motherboard 404.

In various embodiments, the data cable 602 passes through a side opening in the storage bay 802. Accordingly, an adapter card (e.g., the connector card 604) may be mounted to an interior, bottom side of the storage bay 802, such that the data cable 602 attaches to adapter card mounted within the storage bay 802. A storage drive may then be interested through a top opening of the storage bay 802 (e.g., corresponding to a front access of the storage bay 802), wherein inserting the storage into the storage bay 802 couples the storage drive to the adapter card. In various embodiments, the apparatus 800 supports blind-mating of the storage drive.

Figure 9:
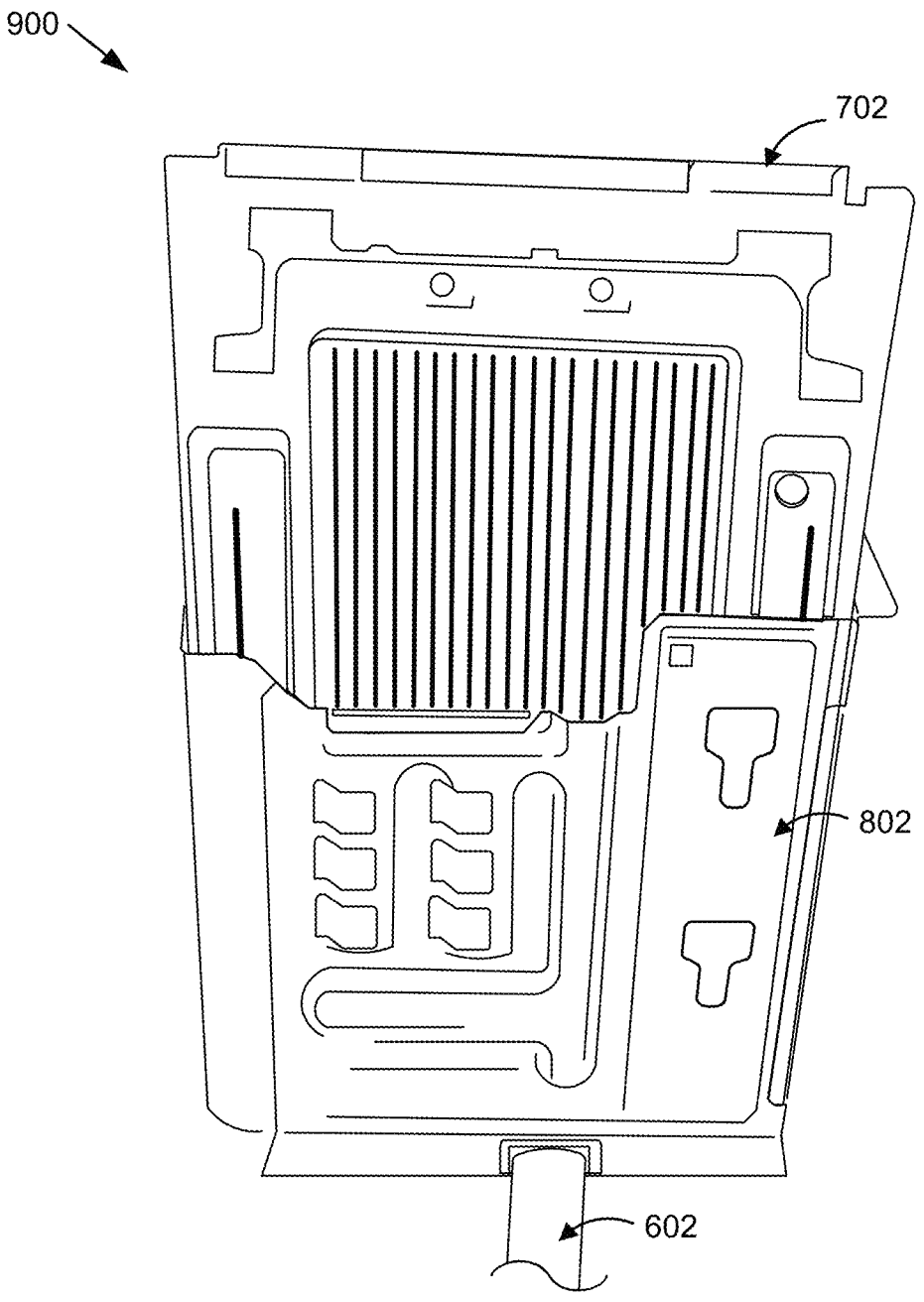
FIG. 9 illustrates one example of an arrangement that supports techniques for signal routing via data cable in a system lacking a backplane in accordance with aspects of the present disclosure.

FIG. 9 depicts an exemplary arrangement 900, wherein a mounting tray 702 (i.e., comprising a storage drive) is inserted into the storage bay 802, thereby coupling the storage drive to the data cable 602.

Figure 10:
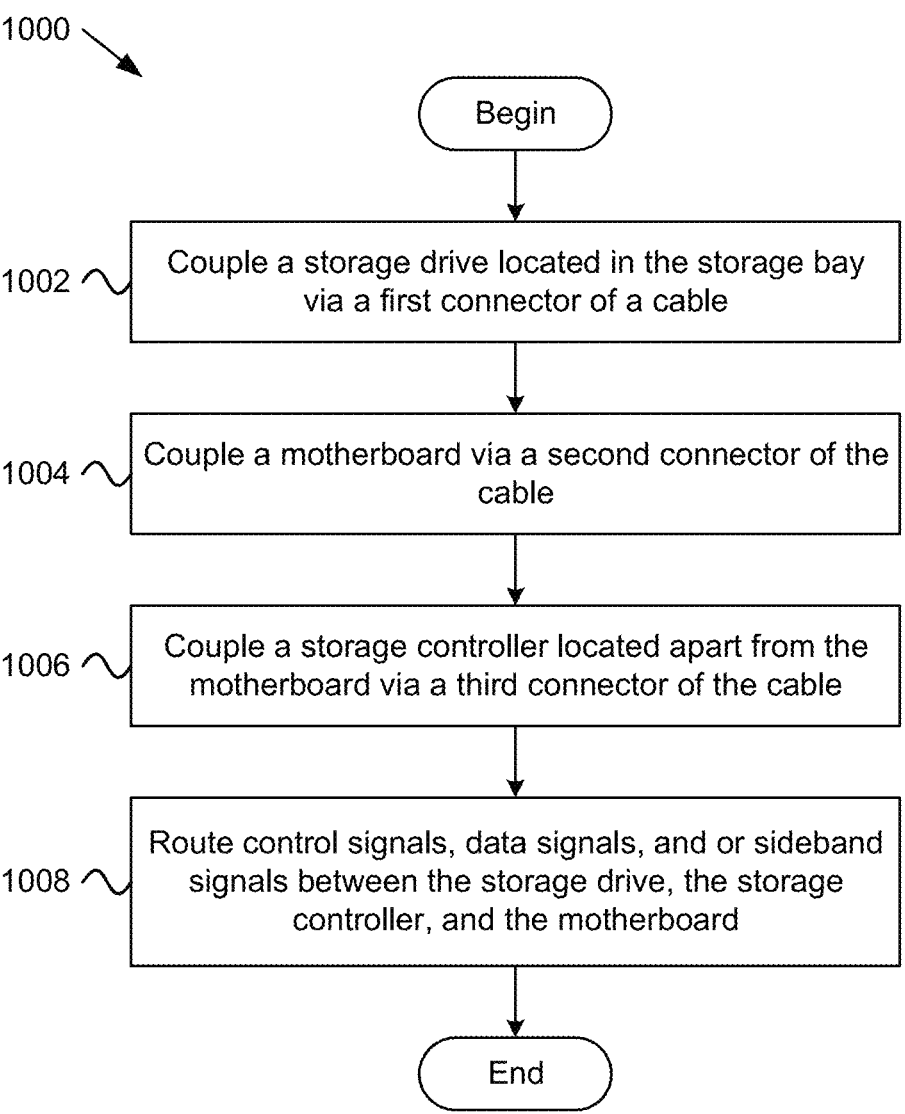
FIG. 10 illustrates one example of a representative method for signal routing via data cable in a system lacking a backplane in accordance with aspects of the present disclosure.

FIG. 10 depicts an exemplary method 1000 for collating and selectively presenting communications, in accordance with aspects of the present disclosure. In various embodiments, the method 1000 is performed by a data cable apparatus, such as the high speed cable apparatus 110 and/or the apparatus 200, as described above. In some embodiments, all or a portion of the method 1000 is performed by a processor, such as a microcontroller, a microprocessor, a CPU, a graphics processing unit ("GPU"), an auxiliary processing unit ("APU"), a FPGA, or the like.

The method 1000 begins and couples 1002 a storage drive located in the storage bay via a first connector of a cable. Here, the first connector of the cable may be one embodiment of the drive connector 210, the first connector 312, and/or the first connector 612. The storage drive may be one embodiment of the NVME storage drive 304, the storage drive 112, and/or the storage drive 606. The cable may be one embodiment of the high speed cable apparatus 110, the passive cable 208, the high-speed cable 302, the high speed cable 402, and/or the high speed cable 502, and/or the data cable 602. The storage bay may be one embodiment of the enclosure 114, the NVME storage bay 310, and/or the storage bay 802.

The method 1000 includes coupling 1004 a motherboard via a second connector of the cable. The motherboard may be one embodiment of the motherboard 306, the motherboard 404, and/or the motherboard 804. The second connector may be one embodiment of the motherboard connector 212, and/or the second connector 314.

The method 1000 includes coupling 1006 a storage controller located apart from the motherboard via a third connector of the cable. The storage controller may be one embodiment of the storage controller 108 and/or the discrete storage controller 308. The third connector may be one embodiment of the controller connector 214 and/or the third connector 316.

The method 1000 includes routing 1008 control signals, data signals, and/or sideband signals between the storage drive, the storage controller, and the motherboard. In one embodiment, routing 1008 the signals may include looping-back a UBM signal from the storage controller to the motherboard via an interface card coupled to the storage device. In another embodiment, routing 1008 the signals may include combining reset signals received from the storage controller and motherboard, and outputting a combined reset signal to the storage drive. The method 1000 ends.

Figure 11:
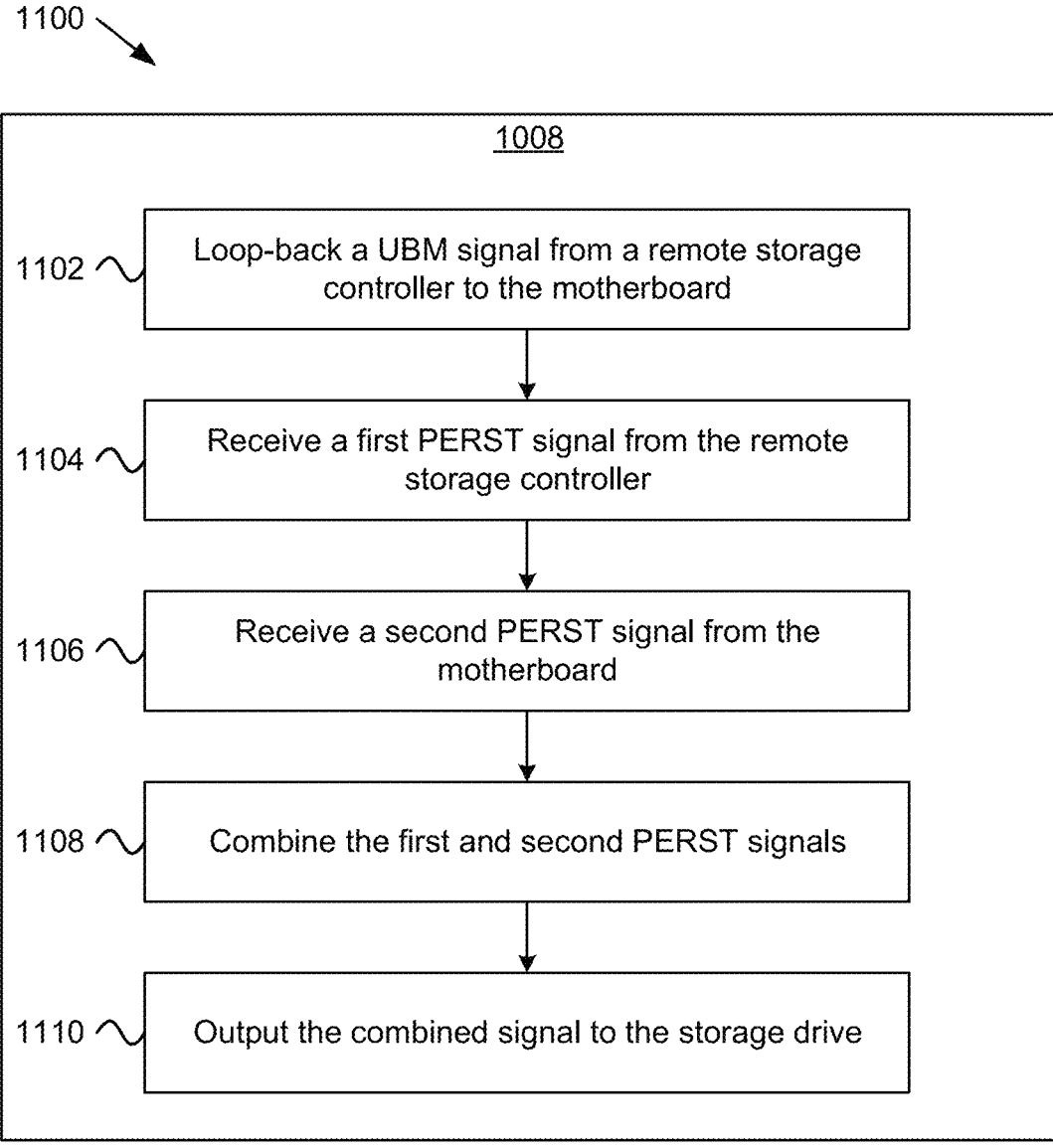
FIG. 11 illustrates one example of a representative method for routing control signals and data signals, in accordance with aspects of the present disclosure.

FIG. 11 depicts an exemplary method 1100 for collating and selectively presenting communications, in accordance with aspects of the present disclosure. In various embodiments, the method 1100 is performed by a data cable apparatus, such as the high speed cable apparatus 110 and/or the apparatus 200, as described above. In some embodiments, all or a portion of the method 1100 is performed by a processor, such as a microcontroller, a microprocessor, a CPU, a GPU, an auxiliary processing unit, a FPGA, or the like.

The method 1100 begins and loops-back 1102 a UBM signal from an remote storage controller to the motherboard. Here, the data cable apparatus may provide a UBM bus between a storage backplane controller on the motherboard and the remote storage controller. In certain embodiments, an interface card coupled to the storage drive (i.e., providing an interface between the storage drive and a high data cable) loops-back the UBM signal to the motherboard.

The method 1000 includes receiving 1104 a first PERST signal from the remote storage controller. The remote storage controller may be one embodiment of the storage controller 108 and/or the discrete storage controller 308.

The method 1000 includes receiving 1106 a second PERST signal from the motherboard. The motherboard may be one embodiment of the motherboard 306, the motherboard 404, and/or the motherboard 804.

The method 1000 includes combining 1108 the first and second PERST signals. In certain embodiments, a logic AND gate is used to combine the first and second PERST signals.

The method 1000 includes outputting 1110 the combined signal to the storage drive. The storage drive may be one embodiment of the NVME storage drive 304, the storage drive 112, and/or the storage drive 606. The method 1000 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
an interface card; and
a three-way cable providing a three-way hot-swappable connection between a storage drive, a motherboard, and a storage controller, the three-way cable comprising:
a first connector configured to couple the storage drive and the interface card;
a second connector configured to couple to the motherboard; and
a third connector configured to couple to the storage controller,
wherein:
the storage drive, the motherboard, and the storage controller are separate from and located apart from each other,
the three-way cable is separate from and detachably coupleable to the storage drive, the motherboard, and the storage controller to form the three-way hot-swappable connection between the storage drive, the motherboard, and the storage controller, and
the three-way cable routes control signals and data signals between the storage drive, the storage controller, and the motherboard.

2. The apparatus of claim 1, wherein the first connector comprises an Enterprise and Data Center Standard Form Factor ("EDSFF") socket connector configured to receive an EDSFF edge connector.

3. The apparatus of claim 1, wherein the cable supports an eight data lane ("×8") Peripheral Component Interconnect Express ("PCIe") connection between the storage drive and the storage controller.

4. The apparatus of claim 1, wherein the interface card is configured to loop-back a Universal Backplane Management ("UBM") signal to the motherboard, wherein the cable supports a UBM bus between the storage controller and a storage backplane controller located on the motherboard.

5. The apparatus of claim 1, wherein the interface card is configured to combine a first PCI Express Reset ("PERST") signal received from the storage controller with a second PERST signal received from the motherboard, and wherein the interface card is further configured to output the combined signal to the storage drive.

6. A system, comprising:
a motherboard;
a storage controller;
a storage bay lacking a backplane card;
a storage drive located in the storage bay; and
a three-way cable providing a three-way hot-swappable connection between the storage drive, the motherboard, and the storage controller, the three-way cable comprising:
a first connector configured to couple to the storage drive;
a second connector configured to couple to the motherboard; and
a third connector configured to couple to the storage controller,
wherein:
the storage drive, the motherboard, and the storage controller are separate from and located apart from each other,
the three-way cable is separate from and detachably coupleable to the storage drive, the motherboard, and the storage controller to form the three-way hot-swappable connection between the storage drive, the motherboard, and the storage controller, and the three-way cable routes control signals and data signals between the storage drive, the storage controller, and the motherboard.

7. The system of claim 6, wherein the motherboard comprises power pins, ground pins, and hot-swap circuitry for the storage drive.

8. The system of claim 6, wherein the motherboard comprises at least one activity indicator, and wherein the cable routes one or more activity signals between the storage drive and the motherboard.

9. The system of claim 6, wherein the first connector comprises an Enterprise and Data Center Standard Form Factor ("EDSFF") socket connector configured to receive an EDSFF edge connector.

10. The system of claim 9, further comprising a connector card coupled with the EDSFF socket connector and configured to adapt a non-EDSFF edge connector of the storage drive to the EDSFF socket connector.

11. The system of claim 6, wherein the cable supports an eight data lane ("×8") Peripheral Component Interconnect Express ("PCIe") connection between the storage drive and the storage controller.

12. The system of claim 6, wherein the cable further comprises an interface card configured to loop-back a Universal Backplane Management ("UBM") signal to the motherboard.

13. The system of claim 12, wherein the cable supports a UBM bus between the storage controller and a storage backplane controller located on the motherboard.

14. The system of claim 6, wherein the cable further comprises an interface card configured to combine a first PCI Express Reset ("PERST") signal received from the storage controller with a second PERST signal received from the motherboard, and wherein the interface card is configured to output the combined signal to the storage drive.

15. The system of claim 6, wherein the first connector is configured to support two storage drives.

16. A method performed at a storage bay lacking a backplane, the method comprising:

detachably coupling a storage drive located in the storage bay to a first connector of a three-way cable;

detachably coupling a motherboard to a second connector of the three-way cable;

detachably coupling a storage controller located apart from the motherboard to a third connector of the three-way cable;

routing control signals and data signals between the storage drive, the storage controller, and the motherboard; and routing one or more Inter-Integrated Circuit ("I2C") sideband signals between the storage drive and at least one service processor located on the motherboard, wherein:

the storage drive, the motherboard, and the storage controller are separate from and located apart from each other, and the three-way cable is separate from and is detachably coupleable to the storage drive, the motherboard, and the storage controller to form a three-way hot-swappable connection between the storage drive, the motherboard, and the storage controller.

17. The method of claim 16, further comprising providing a Universal Backplane Management ("UBM") bus between the storage controller and a storage backplane controller located on the motherboard, and looping-back a UBM signal from the storage controller to the motherboard.

18. The method of claim 16, further comprising:

combining a first PCI Express Reset ("PERST") signal received from the storage controller with a second PERST signal received from the motherboard; and outputting the combined signal to the storage drive.

19. The apparatus of claim 1, wherein the cable routes one or more Inter-Integrated Circuit ("I2C") sideband signals between the storage drive and at least one service processor located on the motherboard.

20. The system of claim 6, wherein the cable routes one or more Inter-Integrated Circuit ("I2C") sideband signals between the storage drive and at least one service processor located on the motherboard.

* * * * *